US012692904B2

(12) United States Patent
Itagaki et al.

(10) Patent No.: US 12,692,904 B2
(45) Date of Patent: ***Jul. 28, 2026

(54) TRIPOD TYPE CONSTANT VELOCITY UNIVERSAL JOINT

(71) Applicant: NTN CORPORATION, Osaka (JP)

(72) Inventors: Taku Itagaki, Shizuoka (JP); Shota Kawata, Shizuoka (JP); Tatsuro Sugiyama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 18/282,332

(22) PCT Filed: Mar. 11, 2022

(86) PCT No.: PCT/JP2022/011102
§ 371 (c)(1),
(2) Date: Sep. 15, 2023

(87) PCT Pub. No.: WO2022/202421
PCT Pub. Date: Sep. 29, 2022

(65) Prior Publication Data
US 2024/0167518 A1     May 23, 2024

(30) Foreign Application Priority Data

Mar. 24, 2021     (JP) ................................. 2021-050587

(51) Int. Cl.
*F16D 3/205*          (2006.01)
(52) U.S. Cl.
CPC .... *F16D 3/2055* (2013.01); *F16D 2200/0021* (2013.01); *F16D 2250/0053* (2013.01); *Y10S 464/905* (2013.01)

(58) Field of Classification Search
CPC ........... F16D 3/2055; F16D 2200/0021; F16D 2250/0053; Y10S 464/905
(Continued)

(56) References Cited

U.S. PATENT DOCUMENTS 8,568,244 B2     10/2013   Kim et al.
12,038,050 B2 *   7/2024   Itagaki .................. F16D 3/2055
(Continued)

FOREIGN PATENT DOCUMENTS

CN          109154328          1/2019
JP          2001-208091        8/2001
(Continued)

OTHER PUBLICATIONS

Universal Joint and Driveshaft Design Manual, AE-7, Society of Automotive Engineers, Inc., Section 3.2.6., pp. 131-140, TJ1079. S62 1979. (Year: 1979).*
(Continued)

*Primary Examiner* — Greg Binda
(74) *Attorney, Agent, or Firm* — Wenderoth, Lind & Ponack, L.L.P.

(57)          ABSTRACT

In a tripod type constant velocity universal joint 1 of a double roller type, R/PCD≥0.0850 and t/PCD≥0.145, where PCD is a pitch circle diameter of a roller guide surface 6 of an outer joint member 2, R is a radius of curvature at an intermediate portion between a body portion 31 and a leg shaft 32 of a tripod member 3, and t is a minimum distance from a large-diameter portion 34a of a spline 34 of the tripod member 3 to an intermediate portion 33.

4 Claims, 4 Drawing Sheets

(58) Field of Classification Search
USPC ......................................................... 464/111
See application file for complete search history.

(56) References Cited

U.S. PATENT DOCUMENTS

| | | | |
|---|---|---|---|
| 2017/0152895 A1 | 6/2017 | Sugiyama | |
| 2019/0101165 A1 | 4/2019 | Yamazaki et al. | |
| 2022/0090635 A1 | 3/2022 | Itagaki et al. | |
| 2024/0352977 A1* | 10/2024 | Itagaki .................. | F16D 3/2055 |

FOREIGN PATENT DOCUMENTS

| | | |
|---|---|---|
| JP | 2001-280358 | 10/2001 |
| JP | 2009-68509 | 4/2009 |
| JP | 2020-106087 | 7/2020 |
| JP | 2020-133859 | 8/2020 |
| WO | 2010/146958 | 12/2010 |

OTHER PUBLICATIONS

International Search Report (ISR) issued Apr. 19, 2022 in International (PCT) Application No. PCT/JP2022/011102.

* cited by examiner

TRIPOD TYPE CONSTANT VELOCITY UNIVERSAL JOINT

TECHNICAL FIELD

The present invention relates to a tripod type constant velocity universal joint used for power transmission of automobiles and various industrial machines.

BACKGROUND ART

In a drive shaft used in a power transmission system of an automobile, a plunging type constant velocity universal joint is coupled to an inboard side (center side in a vehicle width direction) of an intermediate shaft, and a fixed type constant velocity universal joint is coupled to an outboard side (end portion side in the vehicle width direction) in many cases. The plunging type constant velocity universal joint herein allows both angular displacement and relative movement in an axial direction between two shafts, and the fixed type constant velocity universal joint allows the angular displacement between the two shafts but does not allow the relative movement in the axial direction between the two shafts.

A tripod type constant velocity universal joint is known as a plunging type constant velocity universal joint. As the tripod type constant velocity universal joint, there are a single roller type and a double roller type. In the single roller type, a roller inserted into a track groove of an outer joint member is rotatably attached to a leg shaft of a tripod member via a plurality of needle rollers. The double roller type includes a roller inserted into a track groove of an outer joint member, and an inner ring externally fitted to a leg shaft of a tripod member to rotatably support the roller. The double roller type allows the roller to swing with respect to the leg shaft, and thus, has an advantage that induced thrust (shaft force induced by friction between parts inside the joint) and slide resistance can be reduced compared to the single roller type.

In a tripod type constant velocity universal joint of a double roller type described in Patent Literature 1, an outer peripheral surface of a leg shaft of a tripod member and an inner peripheral surface of an inner ring are in contact with each other in a form close to a point on a torque load side. Therefore, in this type of tripod type constant velocity universal joint, a surface pressure at a contact portion between the outer peripheral surface of each shaft and the inner peripheral surface of the inner ring is high particularly when a load torque is high. Therefore, there is a problem that durability of the contact portion of the outer peripheral surface of the leg shaft deteriorates.

In order to solve this problem, Patent Literature 1 below discloses the tripod type constant velocity universal joint of the double roller type in which a hardened layer is formed on the leg shaft by carburizing, hardening, and tempering, the tripod member is made of a steel material having a carbon content of 0.23 to 0.44%, and an effective hardened layer having a limit hardness of 600 Hv is provided.

CITATIONS LIST

Patent Literature

Patent Literature 1: JP 2020-106087 A

SUMMARY OF INVENTION

Technical Problems

The tripod type constant velocity universal joint of the double roller type described in Patent Literature 1 is obtained, for example, by carburizing and hardening chromium-molybdenum steel having a carbon content of 0.34% and then performing high-temperature tempering. In this configuration, the amount of carbon in the steel material can be increased as compared with the related art, and thus, the durability of the leg shaft at the contact portion can be improved even when the contact surface pressure at the contact portion between the outer peripheral surface of the leg shaft and the inner ring increases due to the load of the excessive torque.

On the other hand, an inventor of the present application has further studied the tripod type constant velocity universal joint described in Patent Literature 1, and found that there is a difficulty in strength of a root portion of the leg shaft in exchange for the fact that the durability at the contact portion of the outer peripheral surface of the leg shaft when the torque load is applied can be secured as described above. A tensile load repeatedly acts on the root portion of the leg shaft along with transmission of the torque, but the fatigue strength at the root portion decreases, resulting in insufficient torsion strength at the root portion of the leg shaft.

Therefore, an object of the present invention to improve strength of a root portion of a leg shaft of a tripod member.

Solutions to Problems

The present invention made based on the above findings provides a tripod type constant velocity universal joint including: an outer joint member including track grooves, which extend in an axial direction, at three locations in a circumferential direction, each of the track grooves having a pair of roller guide surfaces arranged to face each other in the circumferential direction; a tripod member including a body portion having a central hole, three leg shafts protruding in a radial direction of the body portion, and an intermediate portion located between the body portion and the leg shafts and having a longitudinal cross section formed in an arc shape, the tripod member having a spline formed in the central hole of the body portion; a roller mounted on each of the leg shafts; and an inner ring that is externally fitted to each of the leg shafts and rotatably supports the roller. The roller is movable in the axial direction of the outer joint member along the roller guide surfaces. The roller and the inner ring form a roller unit, the roller unit being swingable with respect to each of the leg shafts. The tripod member has a carbon content of 0.23% to 0.44% at a core portion, a hardened layer is formed by carburizing, hardening, and tempering, and $R/PCD \geq 0.0850$ and $t/PCD \geq 0.145$, where PCD is a pitch circle diameter of the roller guide surfaces of the outer joint member, R is a radius of curvature at the intermediate portion of the tripod member, and t is a minimum distance from a large-diameter portion of a spline of the tripod member to the intermediate portion.

Since $R/PCD \geq 0.0850$ in this manner, a thickness of the intermediate portion, that is, the minimum distance t between the large-diameter portion of the spline and the intermediate portion can be increased. Specifically, it is possible to set $t/PCD \geq 0.145$. Since the thickness of the intermediate portion is increased in this manner, strength, particularly the fatigue strength, of a root portion (the intermediate portion) of the leg shaft can be enhanced even if a depth of a hardened phase layer increases and toughness of the tripod member decreases. Therefore, torsion strength of the leg shaft can be enhanced, and the degree of freedom in designing the tripod member can be improved.

A surface hardness of each of the leg shafts of the tripod member is preferably 653 HV or more. Thus, it is possible to enhance durability of an outer peripheral surface of the leg shaft when a high torque load is applied, particularly durability of a contact portion with an inner peripheral surface of the inner ring.

An internal hardness of the tripod member is preferably 513 HV or more. When the internal hardness is set to 513 HV or more, an effective hardened layer depth required for the tripod member can be obtained.

Advantageous Effects of Invention

According to the present invention, it is possible to improve the durability at the root portion of the leg shaft of the tripod member.

DESCRIPTION OF EMBODIMENTS

An embodiment of a tripod type constant velocity universal joint according to the present invention will be described with reference to FIGS. 1 to 8.

Figure 1:
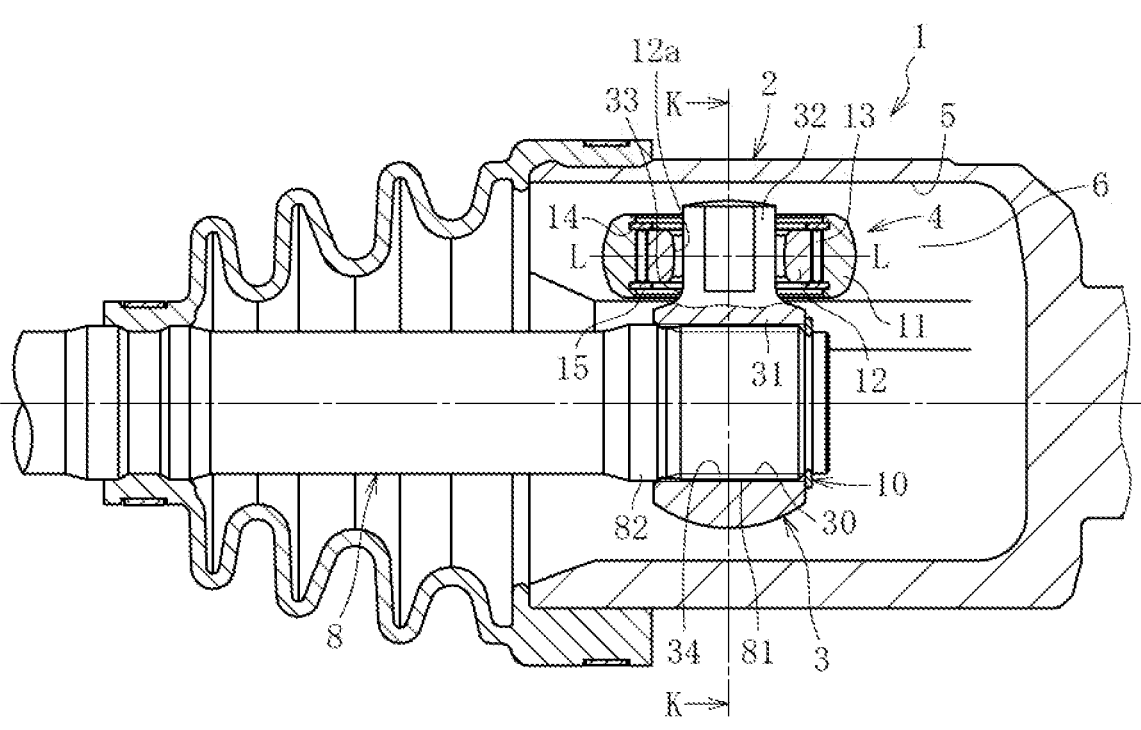
FIG. 1 is a longitudinal cross-sectional view illustrating a tripod type constant velocity universal joint of a double roller type.
Figure 2:
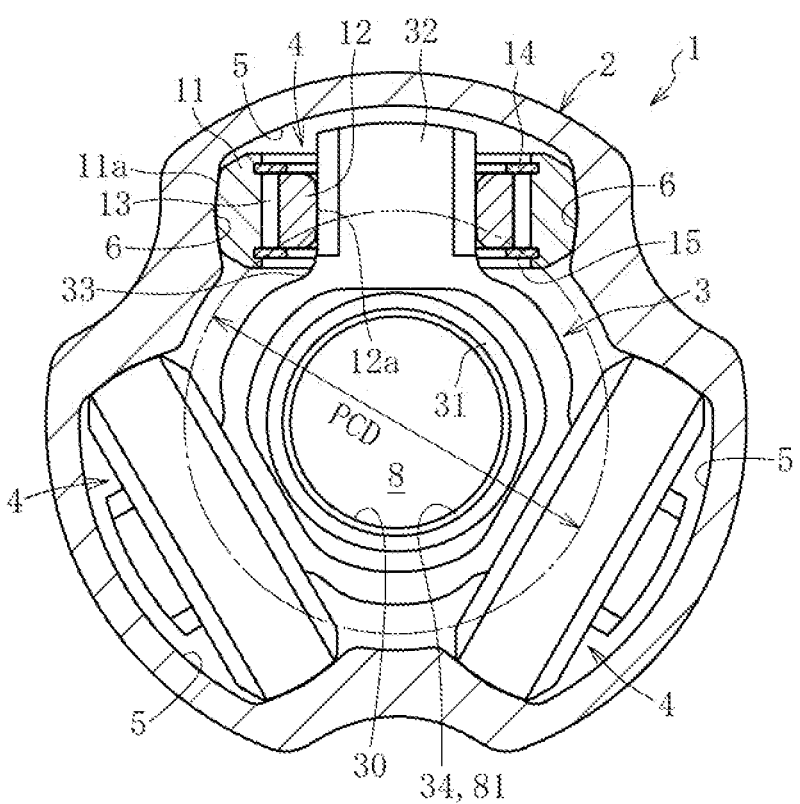
FIG. 2 is a longitudinal cross-sectional view taken along line K-K in FIG. 1.
Figure 3:
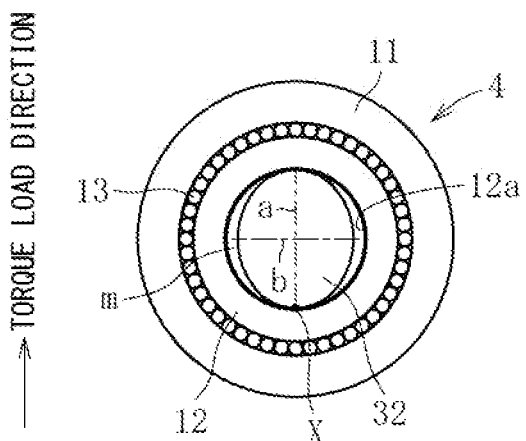
FIG. 3 is a transverse cross-sectional view taken along line L-L in FIG. 1.
Figure 4:
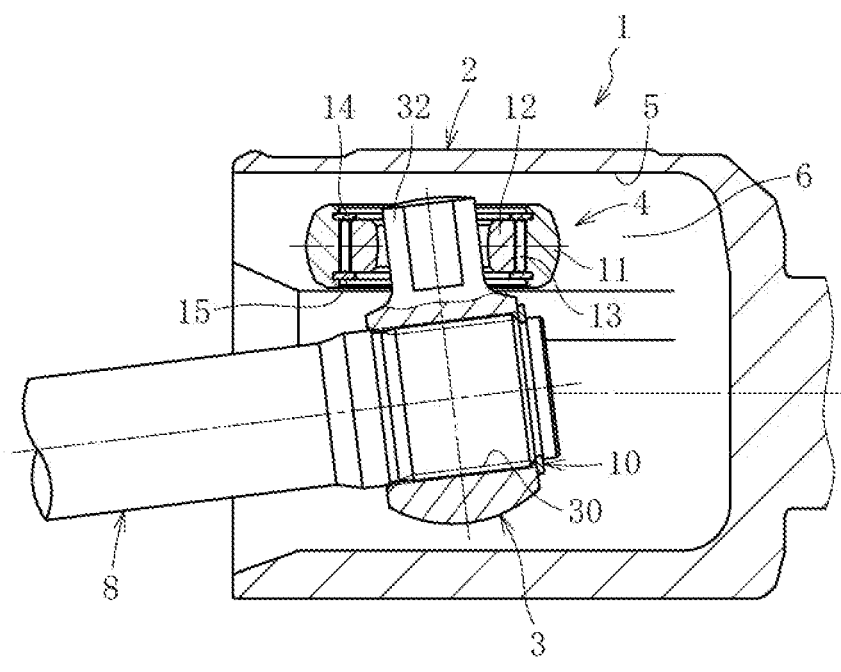
FIG. 4 is a longitudinal cross-sectional view illustrating a state in which the tripod type constant velocity universal joint of FIG. 1 takes an operating angle.

A tripod type constant velocity universal joint 1 of the present embodiment illustrated in FIGS. 1 to 4 is a double roller type. Note that FIG. 1 is a longitudinal cross-sectional view illustrating the tripod type constant velocity universal joint of the double roller type, and FIG. 2 is a partial transverse cross-sectional view taken along line K-K in FIG. 1. FIG. 3 is a transverse cross-sectional view taken along line L-L in FIG. 1, and FIG. 4 is a longitudinal cross-sectional view illustrating the tripod type constant velocity universal joint at an operating angle.

As illustrated in FIGS. 1 and 2, the tripod type constant velocity universal joint 1 has a main part including an outer joint member 2, a tripod member 3 as an inner joint member, and a roller unit 4 as a torque transmitting member. The outer joint member 2 has a cup shape whose one end is open, and includes three linear track grooves 5 extending in an axial direction and formed on an inner peripheral surface at equal intervals in a circumferential direction. In each of the track grooves 5, roller guide surfaces 6 extending in the axial direction of the outer joint member 2 are formed to face each other in the circumferential direction of the outer joint member 2. The tripod member 3 and the roller unit 4 are accommodated inside the outer joint member 2.

The tripod member 3 integrally includes: a body portion 31 (trunnion body portion) having a central hole 30; three leg shafts 32 (trunnion journals) protruding in a radial direction from trisection positions of the body portion 31 in the circumferential direction; and an intermediate portion 33 connecting the body portion 31 and the leg shafts 32. The tripod member 3 is coupled to a shaft 8 as an axis, by fitting a male spline 81 (see FIG. 1) formed on the shaft 8 to a female spline 34 formed in the central hole 8 of the trunnion body portion 31 such that a torque can be transmitted. One end surface of the tripod member 3 is engaged with a shoulder portion 82 provided on the shaft 8, and a retaining ring 10 mounted on a distal end of the shaft 8 is engaged with the other end surface of the tripod member 3, whereby the tripod member 3 is fixed to the shaft 8 in the axial direction.

The roller unit 4 has a main part including an outer ring 11 as a roller, an annular inner ring 12 arranged on the inner side of the outer ring 11 and externally fitted to the leg shaft 32, and a large number of needle rollers 13 interposed between the outer ring 11 and the inner ring 12, and is accommodated in the track groove 5 of the outer joint member 2. The roller unit 4 including the inner ring 12, the needle rollers 13, and the outer ring 11 has a structure such that the inner ring 12, the needle rollers 13, and the outer ring 11 are not separated by washers 14 and 15 as illustrated in FIG. 2.

In this embodiment, an outer peripheral surface of the outer ring 11 is a convex curved surface with an arc having a center of curvature on an axis of the leg shaft 32 as a generatrix. The outer peripheral surface of the outer ring 11 is in angular contact with the roller guide surface 6.

The needle rollers 13 are arranged between a cylindrical inner peripheral surface of the outer ring 11 as an outer raceway surface and a cylindrical outer peripheral surface of the inner ring 12 as an inner raceway surface, and can freely roll between the outer raceway surface and the inner raceway surface.

An outer peripheral surface of each of the leg shafts 32 of the tripod member 3 has a straight shape in any longitudinal cross section including the axis of the leg shaft 32. Further, the outer peripheral surface of the leg shaft 32 has a substantially elliptical shape in a transverse cross section orthogonal to the axis of the leg shaft 32 as illustrated in FIG. 3. The outer peripheral surface of the leg shaft 32 is in contact with an inner peripheral surface 12a of the inner ring 12 in a direction orthogonal to an axis of the joint, that is, in a direction of a major axis a. In an axis direction of the joint, that is, in a direction of a minor axis b, a gap in is formed between the outer peripheral surface of the leg shaft 32 and the inner peripheral surface 12a of the inner ring 12.

As illustrated in FIGS. 1 and 2, the intermediate portion 33 between the body portion 31 of the tripod member 3 and the leg shaft 32 has a concave arc shape in any longitudinal cross section including the axis of the leg shaft 32.

The inner peripheral surface 12a of the inner ring 12 has a convex arc shape in any longitudinal cross section including an axis of the inner ring 12. Since the cross-sectional shape of the leg shaft 32 is substantially elliptical as described above and the predetermined gap in is provided between the leg shaft 32 and the inner ring 12, the inner ring 12 can swing with respect to the leg shaft 32. Since the inner ring 12 and the outer ring 11 are assembled to be relatively rotatable via the needle rollers 13 as described above, the outer ring 11 can swing with respect to the leg shaft 32 integrally with the inner ring 12. That is, in a plane including the axis of the leg shaft 32, the axes of the outer ring 11 and the inner ring 12 can tilt with respect to the axis of the leg shaft 32 (see FIG. 4).

As illustrated in FIG. 4, when the tripod type constant velocity universal joint 1 rotates at the operating angle, the axis of the tripod member 3 tilts with respect to the axis of the outer joint member 2. However, since the roller unit 4 can swing, it is possible to avoid a state in which the outer ring 11 and the roller guide surface 6 obliquely cross each other. As a result, the outer ring 11 rolls horizontally with respect to the roller guide surface 6, induced thrust and slide resistance can be reduced, and low vibration of the joint can be achieved.

Further, since the transverse cross section of the leg shaft 32 is substantially elliptical and the longitudinal cross section of the inner peripheral surface 12a of the inner ring 12 is the arc-shaped convex cross section as described above, the outer peripheral surface of the leg shaft 32 on the torque load side and the inner peripheral surface 12a of the inner ring 12 come into contact with each other in a narrow area close to point contact. Thus, a force to tilt the roller unit 4 is decreased, and stability of a posture of the outer ring 11 is improved.

The above-described tripod member 3 is manufactured by using a steel material through main processes such as forging (cold forging)→machining (turning)→broaching of the spline 34→a heat treatment→grinding of the outer peripheral surface of the leg shaft 32. The outer peripheral surface of the leg shaft 32 can be finished by hardened steel cutting instead of the grinding process. Further, a spheroidizing annealing process and a bonding treatment process can be added before the cold forging. The spheroidizing annealing process can be omitted if there is no problem in forging properties during the cold forging due to circumstances such as use of a material having a small amount of carbon. As the heat treatment, carburizing, hardening, and tempering are performed.

Figure 5:
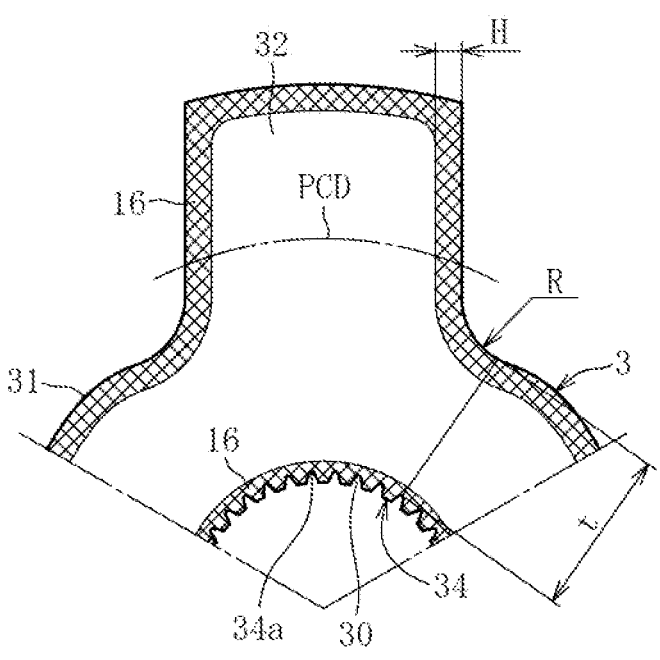
FIG. 5 is a longitudinal cross-sectional view illustrating a hardened layer formed on a tripod member.

FIG. 5 is a cross-sectional view illustrating a hardened layer 16 formed by the heat treatment with respect to the tripod member 3. As illustrated in FIG. 5, the hardened layer 16 is formed on the entire surface of the tripod member 3 including the outer peripheral surface of the leg shaft 32, the outer peripheral surface of the body portion 31, the surface of the intermediate portion 33, and the surface of the female spline 23. In the tripod member 3 as a finished product, the outer peripheral surface of the leg shaft 32 is finished by grinding (or hardened steel cutting), and thus, a depth of the hardened layer 16 on the outer peripheral surface of the leg shaft 32 is shallower than that in the other regions by an allowance caused by the grinding or the like. Note that this allowance is usually as small as about 0.1 mm, and thus, a thickness of the hardened layer 16 is uniformly drawn on the entire surface in FIG. 5.

As described above, in the tripod type constant velocity universal joint of the double roller type, as illustrated in FIG. 3, the outer peripheral surface of the leg shaft 32 and the inner peripheral surface 12a of the inner ring 12 come into point contact with each other in a region X on the torque load side, or come into close contact with each other in a form close to the point. Thus, there is a problem that a surface pressure at a contact portion is high when a high torque load is applied. When the surface pressure is excessive, durability of the contact portion X of the leg shaft 32 deteriorates.

In order to solve this problem, the present inventors conducted the following verification.

Figure 6:
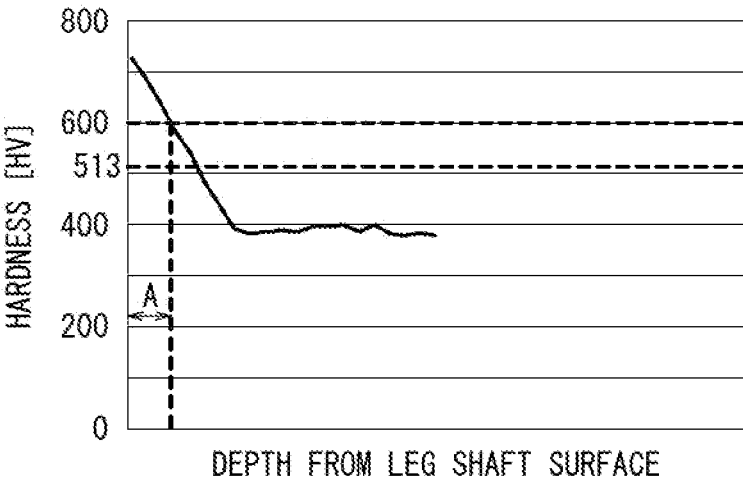
FIG. 6 is a view illustrating a hardness distribution on a leg shaft of a conventional product.

In general, the hardened layer 16 is formed on the surface of the tripod member 3 by performing forging using chromium-molybdenum steel, which is a type of case-hardened steel, as a material, and then performing carburizing, hardening, and tempering as the heat treatment. FIG. 6 illustrates a hardness distribution from the surface of the leg shaft 32 to a core portion when a material (examples thereof include chromium-molybdenum steel according to JIS G 4052, and equivalent materials having the amount of carbon of less than about 0.23%) of the tripod member 3 of the related art is used and subjected to carburizing, hardening, and tempering (hardening temperature: 860° C. and tempering temperature: 180° C.). In this case, as is clear from FIG. 6, the hardness of the surface is more than 513 Hv, but the hardness is less than 513 HV in a region very shallow from the surface. Thus, the durability of the contact portion of the leg shaft 32 is affected when an excessive torque is loaded. Therefore, in order to solve the above problem, it is necessary to form the hardened layer 16 as deep as possible.

Note that an effective hardened layer depth means a distance from a surface of the steel material to a position of a limit hardness. According to JIS G 0557, the limit hardness of the effective hardened layer is 550 HV, but it is also specified that "when the hardness of the hardened layer at a distance of 3 times from the surface exceeds the Vickers hardness of 450 HV the limit hardness exceeding 550 HV may be used by agreement between the parties" In the present embodiment, an internal hardness (a hardness of a non-hardened region) of the tripod member 3 is 513 HV or more as will be described later. Thus, the limit hardness of the effective hardened layer depth is specified to be 600 HV in the present embodiment as an exception example. Note that it is more preferable from the viewpoint of the durability of the leg shaft 7 as the hardness of the hardened layer 16 becomes harder, and thus, it is preferable to specify the limit hardness of the effective hardened layer depth to be 653 HV or more.

In order to deepen the hardened layer 16, the simplest method is to increase a depth of a carburized layer. However, the formation of a deep carburized layer requires an enormous carburizing time, which leads to an increase in manufacturing cost. It is conceivable that a steel material having a high carbon content, for example, carbon steel for machine structure such as S50C to S55C, is used as a material, and a heat treatment method is changed to high-frequency hardening capable of performing hardening deeper than carburizing and hardening. In this case, however, the material becomes harder as the amount of carbon increases, and thus, there is a problem that a processing load at the time of forging the tripod member 3 increases, which leads to an increase in a size of forging equipment or the like.

Figure 7:
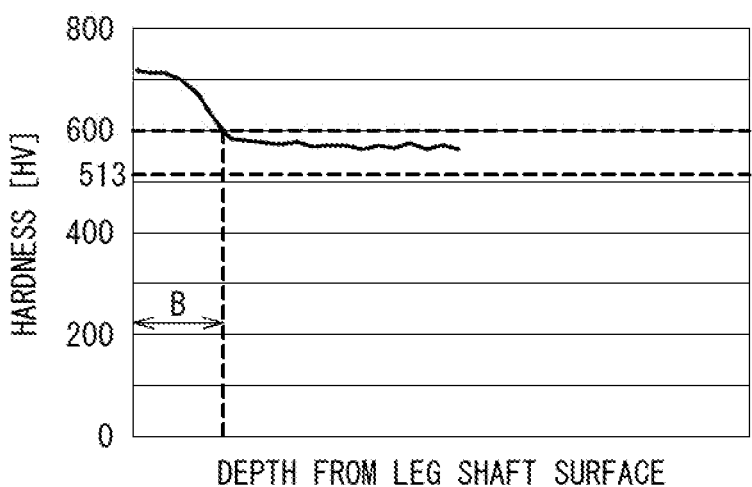
FIG. 7 is a view illustrating a hardness distribution on a leg shaft of an improved product.

Based on the above consideration, the present inventors have verified the effectiveness of using case-hardened steel having a larger amount of carbon than the related art while setting conditions of a carburizing treatment and conditions of hardening and tempering to be similar to those in the related art. FIG. 7 illustrates a hardness distribution when carburizing, hardening, and tempering were performed using chromium-molybdenum steel as a material, the material equivalent to the amount of carbon of about 0.34%. A hardening temperature is 850° C., and a tempering temperature is 180° C. Note that the horizontal axis (depth from surface) in FIG. 7 is illustrated at the same scale as that in FIG. 6.

As is clear from results in FIG. 7, it has been found that the depth of the hardened layer 16 can be increased as intended by increasing the amount of carbon of the case-hardened steel. It can also be understood that the internal hardness becomes 513 HV or more as a result of increasing the depth of the hardened layer 16 in this manner. On the other hand, the hardness (internal hardness) of the core portion after carburizing, hardening, and tempering reaches about 550 HV, there is a possibility that toughness of the leg shaft 32 may decrease, and repeated fatigue strength of the tripod member 3 may decrease. A countermeasure for this problem will be described later.

Note that the case where the material equivalent to the amount of carbon of about 0.34% is used as the material of the tripod member 3 has been exemplified in the above description, a type of material that can be used is not limited. For example, in the case of chromium-molybdenum steel, SCM440 or the like can be used in addition to SCM435. Further, it is also possible to use so-called H-steel (for example, SCM435H, SCM440H, or the like: specified in JIS G 4052) whose hardenability is guaranteed. Other types of steel materials can also be used as long as the steel material is case-hardened steel, and for example, chromium steel (for example, SCr435, SCr440, or the like) specified in JIS G 4053 can also be used as a material. As the chromium steel, for example, H-steel such as SCr435H or SCr440H can also be used. Carbon steel for machine structure (specified in JIS G 4051) such as S10C to S35C can also be used as a material without being limited to case-hardened steel such as chromium-molybdenum steel or chromium steel.

It is preferable to use a steel material having the amount of carbon of 0.44% or less in consideration of moldability in cold forging of the tripod member 3. Note that when the moldability during forging does not cause a problem as in the case of hot forging or the like, for example, a steel material having the amount of carbon exceeding 0.44% can also be used. In the case of case-hardened steel having the amount of carbon of 1% or less, no particular defect occurs even in the hot forging.

In an improved product described above, it has been found that there is a difficulty in strength of a root portion (the intermediate portion 33) of the leg shaft 32 as described above. It is presumed that this is because an increase in the hardness of the entire tripod member 3 from the surface to the deep region leads to a decrease in the toughness of the tripod member 3, and as a result, the fatigue strength of the tripod member 3 decreases at the intermediate portion 33 where a tensile load repeatedly acts with torque transmission, affecting the strength of the intermediate portion 33. When it is attempted to solve this problem by reviewing a material surface and a heat treatment method, the durability at the contact portion X of the leg shaft 32 is likely to deteriorate, so that it is desired to solve the problem from another viewpoint.

Based on the above verification, the tripod member 3 has been reviewed from a shape surface in order to improve the strength at the root portion of the leg shaft 32 in the present invention, Specifically, in the present invention, $R/PCD \geq 0.0850$ and $t/PCD \geq 0.145$ are set assuming that a pitch circle diameter of the roller guide surface 6 of the outer joint member 2 is PCD (see FIG. 2), a radius of curvature of the arc-shaped intermediate portion 33 located between the leg shaft 32 of the tripod member 3 and the body portion 31 is R, and a minimum distance from a large-diameter portion 34*a* of the spline 34 formed on an inner peripheral surface of the body portion 31 of the tripod member 3 to the intermediate portion 33 is t (see FIG. 5). Note that PCD, R, and t are all set in the same unit (mm).

Figure 8:
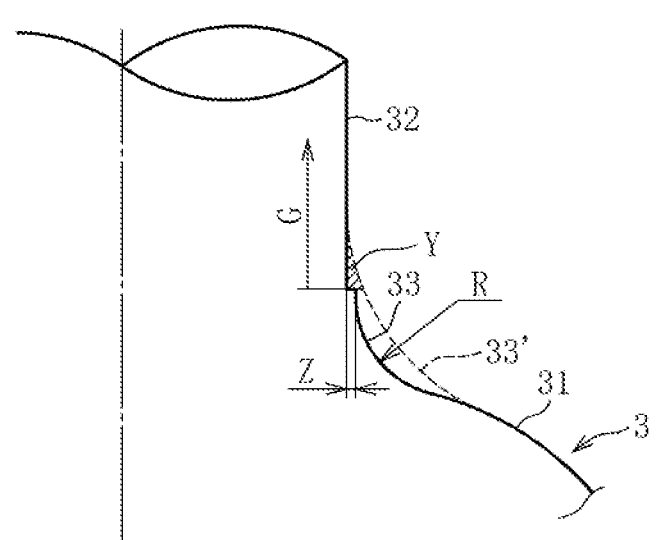
FIG. 8 is an enlarged cross-sectional view of the vicinity of an intermediate portion of the tripod member in FIG. 2.

FIG. 8 is an enlarged cross-sectional view of the vicinity of the intermediate portion 33 of the tripod member 3 in FIG. 2. As indicated by a solid line in FIG. 8, an inner diameter side of the intermediate portion 33 is smoothly connected to the outer peripheral surface of the body portion 31 while drawing a tangent line. On the other hand, an outer diameter side of the intermediate portion 33 is connected to the outer peripheral surface of the leg shaft 32 with a slight step Z. The step Z is caused by retraction of the outer peripheral surface of the leg shaft 32 by the grinding allowance when the outer peripheral surface of the leg shaft 32 is ground after the cold forging of the tripod member 3. When a radius of curvature R of an intermediate portion 33' is increased as indicated by a two-dot chain line, the arc-shaped intermediate portion 33' reaches a planned grinding area G before grinding on an outer diameter side of the intermediate portion 33', and a grinding allowance Y increases. The increase in the grinding allowance Y adversely affects grinding accuracy. From the viewpoint of preventing a decrease in the grinding accuracy, $R/PCD < 0.0850$ is set in the related art.

In the present invention, since $R/PCD \geq 0.0850$, the thickness of the intermediate portion 33, that is, the minimum distance t (see FIG. 8) between the large-diameter portion 34*a* (see FIG. 5) of the spline 34 and the intermediate portion 33 can be increased. Specifically, it is possible to set $t/PCD \geq 0.145$. Since the thickness of the intermediate portion 33 is increased in this manner, the strength, particularly the fatigue strength, of the root portion (intermediate portion 33) of the leg shaft 32 can be enhanced even if the depth of the hardened layer increases and the toughness of the tripod member 3 decreases. Therefore, the torsion strength of the leg shaft 32 can be enhanced, and the degree of freedom in designing the tripod member can be improved.

Although the grinding allowance Y increases on the outer diameter side of the intermediate portion 33 when the radius of curvature R of the intermediate portion 33 increases in this manner, it has been confirmed through the verification of the present inventors that the grinding accuracy at the time of grinding the outer peripheral surface of the leg shaft 32 is not adversely affected if $R/PCD \leq 0.20$. Therefore, an upper limit value of R/PCD is preferably 0.20. That is, it is preferable to set $0850 \leq R/PCD \leq 0.20$. Further, if a value of t/PCD is too large, the tripod member 3 is unnecessarily increased in size, leading to an increase in weight. Thus, an upper limit of the value of t/PCD is preferably 0.20 $(t/PCD \leq 0.20)$.

The embodiment of the present invention described above can also be applied to a tripod type constant velocity universal joint of a double roller type that has another configuration.

For example, it is also possible to form the outer peripheral surface of the leg shaft 32 into a convex curved surface (for example, a convex arc shape in a cross section), and form the inner peripheral surface 12*a* of the inner ring 12 into a cylindrical surface. Further, it is also possible to form the outer peripheral surface of the leg shaft 32 into a convex curved surface (for example, a convex arc shape in a cross section), and form the inner peripheral surface 12*a* of the inner ring 12 into a concave spherical surface to be fitted to the outer peripheral surface of the leg shaft. At this time, it is also possible to provide flanges at both inner diameter end portions of the outer ring to make the washers 14 and 15 unnecessary.

The tripod type constant velocity universal joint 1 described above is not limitedly applied to a drive shaft of an automobile, and can be widely used for power transmission paths of an automobile, industrial equipment, and the like.

REFERENCE SIGNS LIST

1 Tripod type constant velocity universal joint
2 Outer joint member
3 Tripod member
4 Roller unit
5 Track groove
6 Roller guide surface
8 Shaft (shaft)
11 Roller (outer ring)
12 Inner ring
13 Needle roller
16 Hardened layer
30 Central hole
31 Body portion
32 Leg shaft
33 Intermediate portion
34 Female spline

The invention claimed is:

1. A tripod type constant velocity universal joint comprising:

an outer joint member including track grooves, which extend in an axial direction, at three locations in a circumferential direction, each of the track grooves having a pair of roller guide surfaces arranged to face each other in the circumferential direction;

a tripod member including a body portion having a central hole, three leg shafts protruding in a radial direction of the body portion, and an intermediate portion located between the body portion and the leg shafts and having a longitudinal cross section formed in an arc shape, the tripod member having a spline formed in the central hole of the body portion;

a roller mounted on each of the leg shafts; and an inner ring that is externally fitted to each of the leg shafts and rotatably supports the roller, wherein a step is provided between the intermediate portion and each of the leg shafts, the step being reduced in diameter from the intermediate portion toward a radial direction of the leg shaft and connected to an outer peripheral surface of the leg shaft, wherein the roller is movable in the axial direction of the outer joint member along the roller guide surfaces, the roller and the inner ring form a roller unit, the roller unit being swingable with respect to each of the leg shafts, the tripod member has a carbon content of 0.23% to 0.44% at a core portion, and a hardened layer is provided on a surface of each of the leg shafts by carburizing, hardening, and tempering, and $0.0850 \leq R/PCD \leq 0.20$ and $t/PCD \geq 0.145$, where PCD is a pitch circle diameter of the roller guide surfaces of the outer joint member, R is a radius of curvature at the intermediate portion of the tripod member, and t is a minimum distance from a large-diameter portion of the spline of the tripod member to the intermediate portion.

2. The tripod type constant velocity universal joint according to claim 1, wherein a surface hardness of each of the leg shafts of the tripod member is 653 HV or more.

3. The tripod type constant velocity universal joint according to claim 1, wherein an internal hardness of the tripod member is 513 HV or more.

4. The tripod type constant velocity universal joint according to claim 1, wherein $t/PCD \leq 0.20$.

* * * * *